United States Patent Office 3,497,360
Patented Feb. 24, 1970

3,497,360
METHOD AND COMPOSITION FOR PRODUCTION OF DIETETIC BREAD
Hugo J. Schaefer, Yonkers, and John W. Tintera, Katonah, N.Y., by Charles B. Sillery, executor of the estate of said Tintera, deceased, assignors to Virginia H. Tintera, Katonah, N.Y.
No Drawing. Filed Oct. 24, 1965, Ser. No. 505,026
Int. Cl. A21d 2/00
U.S. Cl. 99—90                                11 Claims

ABSTRACT OF THE DISCLOSURE

A yeast bread is produced by mixing a bread dough having a minimum of wheat starch in the order of eight percent of the dry ingredients with a high concentration of yeast in the order of five percent of the dry ingredients and including at least five percent of Jerusalem artichoke flour. The mixed dough is proofed only once for a limited period sufficient to substantially double the dough volume, and is then baked.

---

This invention relates to dietetic bread mixes, a bread produced from such a mix, and the process of manufacturing such a bread. The bread mixes and bread of the present invention are particularly useful for persons whose diets must be extremely carefully controlled because of carbohydrate metabolism difficulties.

Many persons are afflicted with various degrees of difficulty in carbohydrate metabolism. Such difficulties are often accompanied by hyperglycemia (commonly associated with the name "diabetes" or "sugar diabetes" and characterized by a high sugar content of the blood of the victim) or hypoglycemia (low blood sugar). A good discussion of these health problems, in laymen's language, appears in the June 1965 issue of "Family Circle" magazine starting at page 54 and entitled: "Your Blood Sugar—Too High? Too Low?" These conditions are often incurable, and may be very serious and even fatal. However, with early medical diagnosis and treatment, the difficulties attendant upon these disorders can generally be kept under control. The measures for control include continuing periodic medication for those who are seriously afflicted, and careful control of diet. For either the diabetic or the hypoglycemic patient, the most important dietary requirement is to avoid foods which cause rapid changes in blood sugar. This involves very careful selection of foods because many commonly used foods either contain simple sugars which are directly and immediately absorbed by the body, or they contain other carbohydrates which are very rapidly changed by the body into simple sugars and immediately absorbed. Once absorbed, these sugars are immediately available to the blood. Normal individuals can stand the rapid change in the available sugar, but in diabetic or hypoglycemic patients, very serious trauma can result.

Unfortunately, wheat starch, which is one of the main constituents of ordinary bread "The Staff of Life" is one of the carbohydrates which is rapidly converted to simple sugars by the body. The conversion of wheat starch to simple sugars in the body is so rapid that ordinary breads, virtually all of which contain a high concentration of wheat starch, cannot be tolerated by those having carbohydrate metabolism difficulties. However, bread is one of the most popular foods, and it is a serious problem with any special diet to provide enough foods which are interesting and palatable and which have adequate nutritional values.

It is an object of the present invention to provide breads and bread mix compositions for the production of breads which are palatable and nutritious and which can be tolerated by individuals having serious carbohydrate metabolism problems.

One of the important features which makes bread palatable and desirable as a food is the leavening which is usually provided by yeast. While other leavening agents can be employed, yeast is preferred, particularly because it accomplishes various desirable purposes in addition to the leavening or increase in porosity of the bread dough. For instance, the fermentation of the yeast renders the gluten of the flour more elastic and changes some of the insoluble proteins of the gluten into soluble forms. The flavor, color, and texture of the bread are all controlled, in large measure, by the action of the yeast. The growth of the yeast plant in the fermentation accompanying the leavening of the bread dough requires the presence of a number of different substances, most of which are usually found in wheat starch. The most important basic substances which are consumed in the yeast fermentation are the simple or monosaccharide sugars. In order to provide this constituent in the bread dough for the growth of the yeast, sugar must be added to the dough mix, or reliance must be placed upon conversion of wheat starch to sugar by a constituent of the starch called diastase. This conversion of the starch to sugar can be enhanced by the addition of malt to the dough mix, since the malt contains a high concentration of diastase. It is common to add sugar, or malt, or both, to bread mixes to satisfy this requirement. Unfortunately, the monosaccharide sugars which must be present, or produced, in the bread dough for consumption by the yeast in the leavening process are the very sugars which are rapidly absorbed by the body of the consumer and which therefore provide rapid changes in blood sugar. The fermentation action of the yeast in the leavening process is thus similar in many ways to the consumption of sugar by the body of the consumer. Unfortunately, when the sugars and sugar producing materials are available in the bread mix for the consumption by the yeast, they are usually available in a high concentration in the final bread product.

Accordingly, it is another object of the present invention to provide a yeast bread mix, and a bread produced therefrom, in which sufficient monosaccharides and other constituents are available for the leavening action of the yeast, but which provides in the bread product a minimum of rapidly available monosaccharides to the body of the consumer.

It is common to formulate bread dough mixes in such a manner as to assure that presence of a certain amount of sugar in the finished loaf for flavoring purposes. This is obviously undesirable for individuals having carbohydrate metabolism problems.

Accordingly, it is another object of the present invention to provide a bread mix and a bread produced therefrom which is characterized by a very palatable sweet flavor, and which yet has a very minimum of sugar which is available for immediate absorption by the body of the consumer.

The main constituents of white wheat flour ("patent" flour) are gluten and wheat starch. The gluten is primarily a protein material which has coherent and adherent properties which tend to hold together the bread dough and the finished loaf. The wheat starch is primarily carbohydrate material which provides the carbohydrate nutrients for the action of the yeast and for the body of the consumer. These wheat flour constitutents are both important in providing leavened bread which has the appearance and flavor which is appealing to most consumers, and which is expected by them. It is for this reason that most "fancy" breads which contain other flours and constituents, such as those made from rye, corn, soybeans, oats, and others, nevertheless contain a very high proportion of wheat flour components. Thus, most of these fancy breads are basically wheat flour breads with very small fractions of other constituents added for coloring and flavoring properties. These other constituents are present only in token amounts which usually do not substantially change the nutritional values or effect of the bread.

It is another object of the present invention to provide a dietary bread in which the nutritional values are very high and the wheat starch is very low, and in which the carbohydrates which are present in the finished loaf are primarily available through digestion to the body of the consumer on a low-speed basis. That is, the carbohydrates are "slow-burning".

Many of the high-protein and low-carbohydrate food substances which are recognized as valuable for those who have carbohydrate metabolism difficulties, and which are available in the form of flours which could be incorporated into bread, are not particularly palatable or desirable in flavor when incorporated in bread.

Accordingly, it is another object of the invention to provide a bread mix and bread made therefrom which is very nutritive and which provides the dietary requirements for those having carbohydrate metabolism problems, and yet which is very palatable to the taste and satisfying to the consumer.

It is another object of the invention to provide a bread having low available carbohydrates which is very valuable and beneficial to those who simply have weight control problems.

Another object of the invention is to provide a bread which is particularly valuable for hypoglycemia victims who have the common accompanying difficulty of being overweight.

Further objects and advantages of the invention will be apparent from the following description of the invention.

In carrying out the invention in one preferred form thereof, there may be provided a method for producing a yeast bread including the steps of mixing a bread dough having a minimum of wheat starch in the order of eight percent of the dry ingredients and having a high concentration of yeast in order of five percent of the dry ingredients. The dough is proofed only once for a limited period sufficient to substantially double the dough volume and then immediately baked. In one preferred embodiment, the composition of the bread dough exclusive of water may include from eight percent to fourteen precent wheat starch, from 5.7 percent to 7.5 percent Jerusalem artichoke flour, from nine percent to sixteen percent wheat protein, sufficient yeast to provide a yeast to wheat starch ratio of at least one-to-three and the remainder of the dry constituents including non-wheat flours such as oat flour and soy flour.

Other embodiments and examples, and a detailed description of various features of the invention follow below.

One of the most important discoveries in accordance with the present invention is that a yeast leavened bread can be produced successfully from a dough mix in which the wheat starch comprises as little as eight percent of the total dry ingredients of the dough, by weight. When the wheat starch is present in this low proportion, it is very substantially consumed by the yeast in the leavening process so that there is very little wheat starch remaining in the leavened loaf of bread after baking. In accordance with the present invention, the wheat starch may be present initially in a proportion up to approximately fourteen percent by weight. However, it is preferably kept to an absolute minimum which appears to be approximately eight percent. In order to make the bread dough rise sufficiently with so little wheat starch available to "feed" the yeast, a high ratio of yeast to wheat starch is employed. This ratio is preferably from ⅓ to ⅔. This refers to commercially available compressed yeast.

In prior bread-making processes, it has been common, not only to add sugar as a yeast food, but also to add various other materials, such as malts, which are effective in converting wheat starch to sugar so that it may be directly effective as a food for the yeast. In accordance with the present invention, it is particularly desirable to avoid any conditions or any constituents which may cause the presence of residual sugar in the finished bread product. Malts, and other so-called yeast "foods" which promote the conversion of wheat starch to sugar are likely to do just this. These materials enhance the action of the yeast simply by accelerating the conversion of wheat starch to sugar so that there is plenty of sugar available as a direct food for the yeast.

Accordingly, in the present invention, the use of malts and other yeast food materials which enhance the conversion of wheat starch to sugar is avoided, and instead, a high proportion of yeast is employed in order to obtain the desired leavening action by consuming virtually all of the sugar which is available from the normal conversion of wheat starch to sugar. Such conversion is due to the normal content of a substance called diastase in the wheat flour which is present in the mix without the addition of malt.

Stated another way, when malts, and other materials of a similar nature, are added to the composition, the objective is generally to obtain sufficient leavening of the bread with a smaller amount of initial yeast added to the mix. In those instances, with the malt present, the conversion of wheat starch to sugar is likely to outrun the consumption of that sugar by the yeast in the leavening process so as to result in a higher proportion of residual sugar in the finished product.

It is one of the important features of this invention that no sugars are added to the composition to enhance the fermentation action of the yeast. Basically, the only carbohydrate present which supports the growth of the yeast in any substantial way is the wheat starch.

It has been discovered thta in order to obtain a satisfactorily light loaf with so little carbohydrate available to sustain the leavening action of the yeast, the leavening must be carried out quickly, and the bread promptly baked after the fast leavening process before the gases have a chance to escape and the bread has a chance to fall. Generally, the proofing time is only about thirty minutes, or until the bread dough mix has approximately doubled in volume.

Generally speaking, in accordance with the present invention, a bread is produced which is high in protein, moderately high in fat content, very low in rapidly available carbohydrates, and which is made sweet and palatable, without the addition of available carbohydrates, by the non-nutritive sweetener consisting of Jerusalem artichoke flour.

Specific examples of the composition and the method in accordance with the present invention are as follows:

EXAMPLE A

| Ingredients: | Percent of dry ingredients |
| --- | --- |
| 4 lbs. wheat flour (gluten) | 17.1 |
| 2 lbs. wheat flour (vital gluten) | 8.5 |
| 12 lbs. oat flour | 51.5 |
| 2 lbs. soy flour | 8.5 |
| 1½ lbs. Jerusalem artichoke flour | 6.4 |
| 9 oz. salt | 2.4 |
| ¾ oz. sodium propionate | 0.3 |
| 1 lb., 4 oz. yeast | 5.3 |
| 9 qts. water. | |

All of the ingredients except the water are mixed together in a dry blend Immediately after dry blending, the water is added at luke-warm temperature, and mixed in for about seven or eight minutes. A standard four-speed bread mixing machine is used. It is run on low speed for about six minutes, and then at second speed for about two minutes. After mixing, the dough is scaled into 1 lb., 2 oz. loaf sizes and then proofed for about thirty minutes in steam so that the volume of the scaled dough approximately doubles to fill the pan.

The bread is then paked at 360° F. for a maximum of about fifty-five minutes. The baking is carried out without steam. With the quantities given above, thirty-six loaves of bread are obtained which are very palatable and appetizing in appearance, and which can be tolerated in surprising quantities by individuals having serious carbohydrate metabolism difficulties.

EXAMPLE B

| Ingredients: | Percent of dry ingredients |
|---|---|
| 4 lbs. wheat flour (standard patent) | 15.1 |
| 3 lbs. wheat flour (vital gluten) | 11.3 |
| 12 lbs. oat flour | 45.2 |
| 3 lbs. soy flour | 11.3 |
| 2 lbs. Jerusalem artichoke flour | 7.5 |
| 12 oz. shortening | 2.8 |
| 12 oz. salt | 2.8 |
| ¾ oz. sodium propionate | 0.2 |
| 1 lb. yeast | 3.8 |
| 9 qts. water. | |

The mixing, scaling, proofing, and baking procedure is exactly as given above, except that the bread is baked for fifty minutes at 375° F.

| Ingredients: | Percent of dry ingredients |
|---|---|
| 12 lbs. oat flour | 46.1 |
| 4¾ lbs. wheat flour (standard patent) | 18.2 |
| 2 lbs. wheat flour (vital gluten) | 7.7 |
| 3 lbs. soy flour | 11.5 |
| 1½ lbs. Jerusalem artichoke flour | 5.7 |
| ¾ oz. calcium propionate | 0.2 |
| 12 oz. salt | 2.9 |
| 12 oz. vegetable shortening | 2.9 |
| 1 lb., 4 oz. yeast | 4.8 |
| 9 qts. water. | |

The method again is essentially the same as given in Example A except that the dough mix may be given a floor time of approximately thirty minutes, after which it is scaled and shaped into loaves which are placed in groups on large pans. They are then proofed in steam until they are as high as the edge of the pan, and then baked at 350° F. for approximately sixty-five minutes.

In all of the above examples, the sodium propionate, or the calcium propionate, may be omitted, if desired. These materials are useful as preservatives, but there is some controversy among the authorities as to whether or not they are harmful to diabetics or hypoglycemics.

EXAMPLE D

A pre-packaged dry mix for the production of yeast bread in accordance with the present invention is packaged as follows: A first inner package is provided containing the following ingredients:

| | Parts |
|---|---|
| Wheat flour (gluten) | 34 |
| Wheat flour (vital gluten) | 17 |
| Oat Flour | 103 |
| Soy flour | 17 |
| Jerusalem artichoke flour | 13 |
| Salt | 5 |

A second inner package is provided containing 10.7 parts of compressed yeast.

A complete package of a typical size in accordance with this example has a total weight of approximately two pounds. The instructions for use of the mix provide for the opening of both inner packages, mixing the contents together, and then adding one and one-half pints of lukewarm water, mixing into a dough, and scaling into three loaves in separate pans. The individual loaves are then proofed for a period sufficient to allow the dough to rise to fill the pan, and then the breads are baked in a dry oven for about fifty minutes at 360° F.

The pre-packaged dry mix of Example D is convenient for sale as a "mix" product from grocery shelves and diet food stores for the preparation of conveniently small family-sized batches of bread in accordance with the present invention. Thus, fresh bread can be easily available to every household of a diabetic or hypoglycemic, whether or not such bread is available from local bakeries.

The proportions of ingredients given above for Examples A and D are substantially identical. Furthermore, the proportions given for Examples B and C are more closely related to those of Example A than is immediately apparent. Example A employs gluten flour, while Examples B and C employ patent flour. However, these flours each contain both wheat starch and wheat protein. The only difference is that the gluten flour has less starch and more protein than the patent flour. Since the vital gluten flour used in all of the examples is essentially all wheat protein, and contains virtually no wheat starch, the desired amounts and ratios of wheat starch and wheat protein can be obtained either with gluten flour or ordinary patent flour mixed together in the proper ratio with the vital gluten flour. Thus, if the high starch standard patent flour is used, a higher proportion of the vital gluten flour is used with it.

According to the United States Department of Agriculture Handbook No. 8 entitled "Composition of Foods," and revised December, 1963, the percentages by weight of the protein, fat, and carbohydrate contents of the various wheat flours just mentioned above, and the other major constituents of the compositions in accordance with the above examples, which are available to the body of a consumer, are as follows:

| | Percent protein | Percent fat | Percent carbohydrate |
|---|---|---|---|
| Wheat flour (standard patent) | 12 | 1 | 75 |
| Wheat flour (gluten) | 41 | 2 | 47 |
| Wheat flour (vital gluten) (from another source) | 96 | 1 | 1 |
| Oat flour | 14 | 7 | 68 |
| Soy flour | 37 | 20 | 30 |
| Jerusalem artichoke flour | 2 | 0 | 0* |

*Handbook states 16.7% carbohydrate—of doubtful availability.

Applying the food value analysis percentages given immediately above to the compositions of the various examples, the percentages of total dry constituents representing proteins, fats, and carbohydrates derived from the various major sources in each of the examples can be computed as follows:

EXAMPLE A

| | Percentages of total dry constituents | | |
|---|---|---|---|
| | Protein | Fat | Carbohydrate |
| Wheat flour (gluten) | 7 | 3.4 | 8.0 |
| Wheat flour (vital gluten) | 8.2 | | |
| Total wheat flour food constituents | 15.2 | 3.4 | 8.0 |
| Oat flour | 7.2 | 3.6 | 35.0 |
| Soy flour | 3.2 | 1.7 | 2.6 |
| Jerusalem artichoke flour | 0.1 | 0 | 0 |
| Total | 25.7 | 8.7 | 45.6 |

The corresponding food composition values for Example B are as follows:

EXAMPLE B

|  | Protein | Fat | Carbohydrate |
|---|---|---|---|
| Wheat flour (standard patent) | 1.8 | 0.2 | 11.3 |
| Wheat flour (vital gluten) | 10.9 | 0 | 0 |
| Total wheat flour constituents | 12.7 | 0.2 | 11.3 |
| Oat flour | 6.3 | 3.2 | 30.7 |
| Soy flour | 4.2 | 2.3 | 3.4 |
| Jerusalem artichoke flour | 0.2 | 0 | 0 |
| Shortening | 0 | 0.8 | 0 |
| Total | 23.4 | 6.5 | 45.4 |

The corresponding food composition values for Example C are as follows:

EXAMPLE C

|  | Protein | Fat | Carbohydrate |
|---|---|---|---|
| Wheat flour (standard patent) | 2.2 | 0.1 | 13.7 |
| Wheat flour (vital gluten) | 7.4 | 0 | 0 |
| Wheat flour total | 9.6 | 0.1 | 13.7 |
| Oat flour | 6.5 | 3.2 | 31.4 |
| Soy flour | 4.3 | 2.3 | 3.5 |
| Jerusalem artichoke flour | 0.1 | 0 | 0 |
| Shortening | 0 | 2.9 | 0 |
| Total | 20.5 | 8.5 | 48.6 |

The Jerusalem artichoke flour referred to in the above-mentioned examples is a dehydrated product which consists of pulverized tuberous roots of the Jerusalem artichoke plant. This material is commercially available under the name "American Jerusalem Artichoke Flour." It is well known for its high content of a non-nutritive sweetener called inulin.

The soy flour referred to in the above examples is a flour produced from soy beans. Soy bean flours are regularly produced with various amounts of fat content. Since fats are quite acceptable to diabetics and hypoglycemics, the full fat flour is preferred and is intended to be used in the above examples. Furthermore, in the Examples B and C, shortening is added in addition to the high fat content of the soy flour. The high fat content improves the palatability and the nutritional value, and accordingly is preferred. However, it is possible to produce an acceptable product with soy flours having reduced fat content, and without shortening.

The yeast used in the above examples is generally compressed yeast. However, an equivalent amount of dried yeast may be substituted, if desired.

When shortening is added, any standard commercially available shortening is acceptable.

As previously mentioned above, it is believed to be an important feature of the present invention to employ a high proportion of yeast in relation to the amount of wheat starch present. As illustrated by the examples, the ratio of yeast to wheat starch may preferably be in the range from in the neighborhood of 1/3 to 2/3. The first ratio is illustrated in Examples B and C, and the second ratio is illustrated in Example A.

Of all of the examples, Example A best illustrates the preferred method and composition.

As previously discussed above, the proportion of wheat starch is held at a minimum value which will provide a bread which will rise sufficiently. This is preferably in the range from about eight percent, as illustrated in Example A, to in the order of fourteen percent, as illustrated in Example C. Furthermore, in accordance with another feature of the invention, it is preferred to provide at least about nine percent of wheat protein (gluten), as illustrated in Example C, and preferably at least in the order of fifteen percent as illustrated in Example A. The wheat gluten is the binding substance which holds the loaf together and gives it strength and body, even after leavening.

In accordance with another important feature of the invention, a substantial proportion of Jerusalem artichoke flour is incorporated for the purpose of imparting a sweet and palatable flavor to the bread without employing sugars which are readily assimilated by the body. It is believed that the Jerusalem artichoke flour also contains various beneficial nutrient substances, although the caloric value of the conventional proteins, fats, and carbohydrates which are available for assimilation by the body are virtually nil. The preferred proportions of Jerusalem artichoke flour in the compositions in accordance with the present invention are in the range from about 5.7 percent to about 7.5 percent, as respectively illustrated by Examples C and B.

From the above description, it is apparent that this invention has substantially achieved all of the objects and advantages set forth above.

While this invention has been shown and described in connection with a single preferred embodiment, it is apparent that various changes and modifications, in addition to those mentioned above, may be made by those who are skilled in the art without departing from the basic features of the invention. Accordingly, it is the intention of the applicant to protect all variations and modifications within the true spirit and valid scope of this invention.

What is claimed is:

1. A method of producing a yeast bread comprising the steps of mixing a bread dough having a minimum of wheat starch in the order of 8 percent of the dry ingredients with a high concentration of yeast in the order or 5 percent of the dry ingredients, and including at least 5 percent of Jerusalem artichoke flour, proofing the mixed dough only once for a limited period sufficient to substantially double the dough volume, and then immediately baking.

2. A yeast bread produced by mixing a bread dough containing wheat starch in the order of 8 percent of the dry ingredients with a high concentration of yeast in the order of 5 percent of the dry ingredients, and including Jerusalem artichoke flour in a proportion of at least 5 percent of the dry ingredients, proofing the mixed dough for a period long enough for the resulting yeast fermentation to consume a substantial proportion of the available wheat starch, and then immediately baking.

3. A method of producing a yeast bread comprising the steps of mixing a bread dough containing wheat starch in the order of 8 percent of the dry ingredients with a high concentration of yeast in the order of 5 percent of enough for the resulting yeast fermentation to consume a substantial proportion of the available wheat starch, and then immediately baking.

4. A dry mix for the production of the yeast bread comprising sufficient gluten flour to provide from 8 percent to 14 percent wheat starch in the total dry mix, an amount of vital gluten flour sufficient to provide from 9 percent to 16 percent wheat protein in the total dry mix when taken with the wheat protein of the gluten flour, Jerusalem artichoke flour sufficient to comprise at least 5.7 percent, and yeast in an amount sufficient to provide a yeast to wheat starch ratio from 1/3 to 2/3, the remainder consisting essentially of oat flour and soy flour.

5. A dry mix as in claim 4 in which the remainder comprises six parts, the soy flour comprising about one part of the remainder, and the oat flour comprising about five parts thereof.

6. A dry mix as in claim 4 in which the yeast is packaged separately.

7. A bread dough composition which is particularly adapted to produce a bread having a low proportion of wheat starch and sugar in the finished product, said bread dough composition, exclusive of water, consisting essentially of the following: from 8 percent to 14 percent wheat starch, an amount of yeast sufficient to provide a yeast to wheat starch ratio from 1/3 to 2/3, from 5.7 percent to 7.5 percent Jerusalem artichoke flour, from 9 percent to 16 percent wheat protein, the remainder of the dry constituents consisting essentially of non-wheat flours such as oat flour and soy flour.

8. A pre-packaged dry mix for the production of yeast bread comprising two separate inner packages, the first of said inner packages containing a mixture of the following ingredients: about eight parts of wheat starch, about fifteen parts of wheat protein, about six parts of Jerusalem artichoke flour, about nine parts of soy flour, and about fifty parts of oat flour, the second of said inner packages consisting of about five parts of compressed yeast.

9. A composition for the production of yeast bread comprising oat flour, soy flour, and a limited amount of high protein wheat flour providing at least 9.5 percent gluten and between 8 percent and 13.7 percent wheat starch in relation to the weight of total dry ingredients, the composition being sweetened substantially exclusively by the presence of at least 5.7 percent Jerusalem artichoke flour as a non-nutritive sweetener, the assimilable carbohydrates of said composition consisting essentially of said wheat starch and the carbohydrate content of said oat and soy flours, the enzymes present which are capable of converting wheat starch to sugar being limited to the enzymes which are present in the wheat flour of the composition.

10. A dry mix as claimed in claim 4 characterized by the absence of any added yeast food in the mix.

11. A yeast bread having a low proportion of wheat starch and sugar produced by blending a mixture of dry ingredients in the following proportions: from 8 percent to 14 percent wheat starch, an amount of yeast sufficient to provide a yeast to wheat starch ratio from 1/3 to 2/3, from 5.7 percent to 7.5 percent Jerusalem artichoke flour, from 9 percent to 16 percent wheat protein, the remainder of the dry ingredients consisting essentially of non-wheat flours such as oat flour and soy flour; adding and mixing water to form a dough, proofing the dough, and then baking the dough to form bread.

References Cited

UNITED STATES PATENTS

| 2,086,184 | 7/1937 | Haas | 99—90 |
| 3,097,946 | 7/1963 | Menzi | 99—90 X |

FOREIGN PATENTS

| 123,883 | 3/1919 | Great Britain. |

OTHER REFERENCES

Baker, C. E.: American Miller and Processor, January 1948, article entitled "Prepared Flours" pp. 78–85 (page 80 only relied on).

U.S.D.A. Technical Bulletin No. 33, October 1927, article by D. N. Shoemaker entitled "Jerusalem Artichoke as a Crop Plant" (page 11 only relied on).

LIONEL M. SHAPIRO, Primary Examiner

U.S. Cl. X.R.

99—91

PO-1050
(5/69)

UNITED STATES PATENT OFFICE
CERTIFICATE OF CORRECTION

Patent No. 3,497,360            Dated February 24, 1970

Inventor(s) HUGO J. SCHAEFER and JOHN W. TINTERA

It is certified that error appears in the above-identified patent and that said Letters Patent are hereby corrected as shown below:

Column 1, line 6, "assignors" should read --assignor--.

Column 2, line 53, "that" should read --the--.
Column 5, line 11, "paked" should read --baked--.
Column 7, line 42, after "fat" and before "flour" insert --soy--.
Column 8, line 32, "or" should read --of--.
         After line 50 and before line 51, insert --the dry ingredients, and including Jerusalem artichoke flour in a proportion of at least 5 percent of the dry ingredients, proofing the mixed dough for a period long--.

SIGNED AND
SEALED
JUL 28 1970

(SEAL)
Attest:

Edward M. Fletcher, Jr.
Attesting Officer

WILLIAM E. SCHUYLER, JR.
Commissioner of Patents